May 1, 1928.
C. R. BUCHET ET AL
1,668,003
GREASE MEASURING AND DISPENSING APPARATUS
Filed April 28, 1924   2 Sheets-Sheet 2
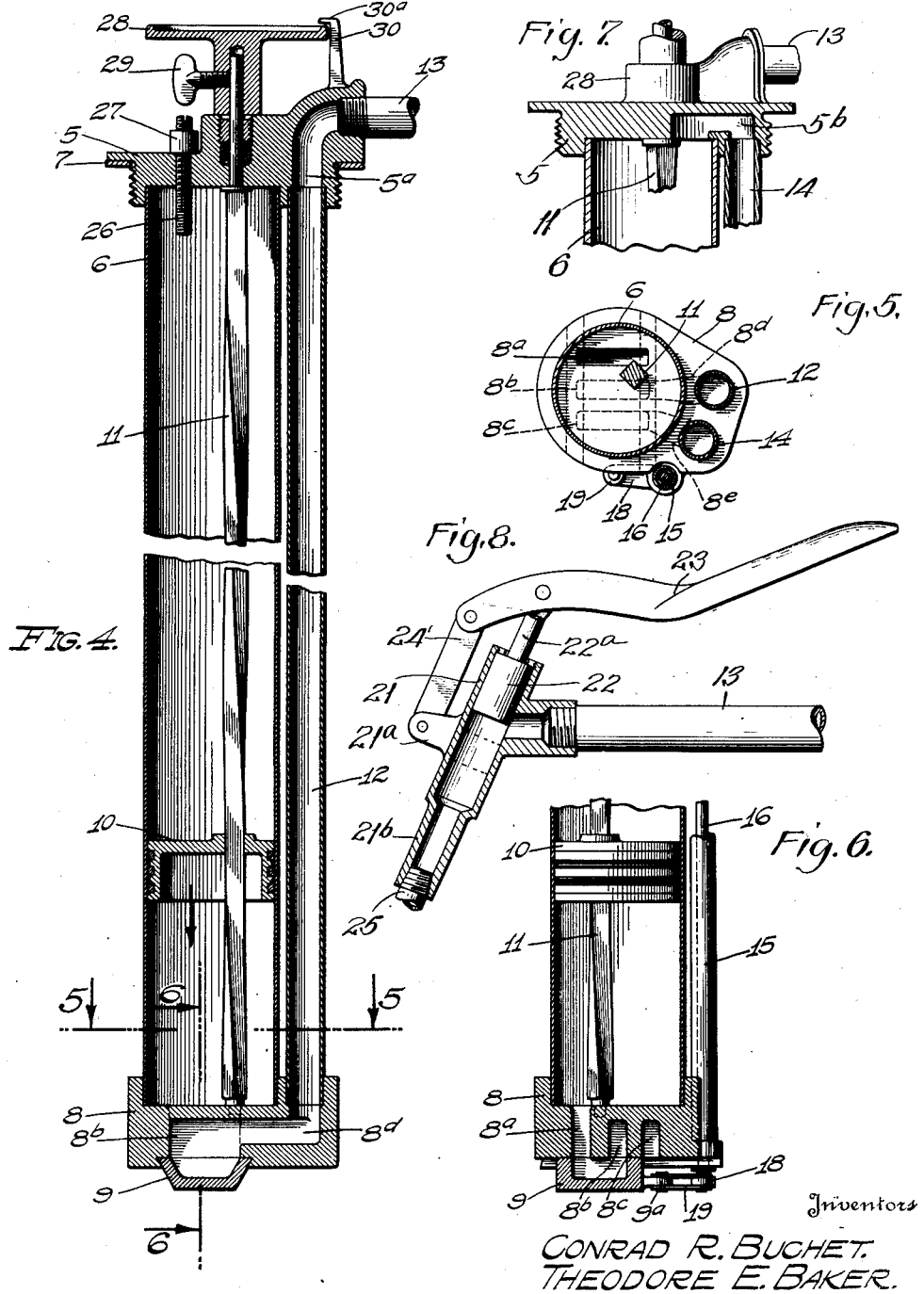
Inventors
CONRAD R. BUCHET.
THEODORE E. BAKER.
By A. B. Bowman
Attorney Patented May 1, 1928.

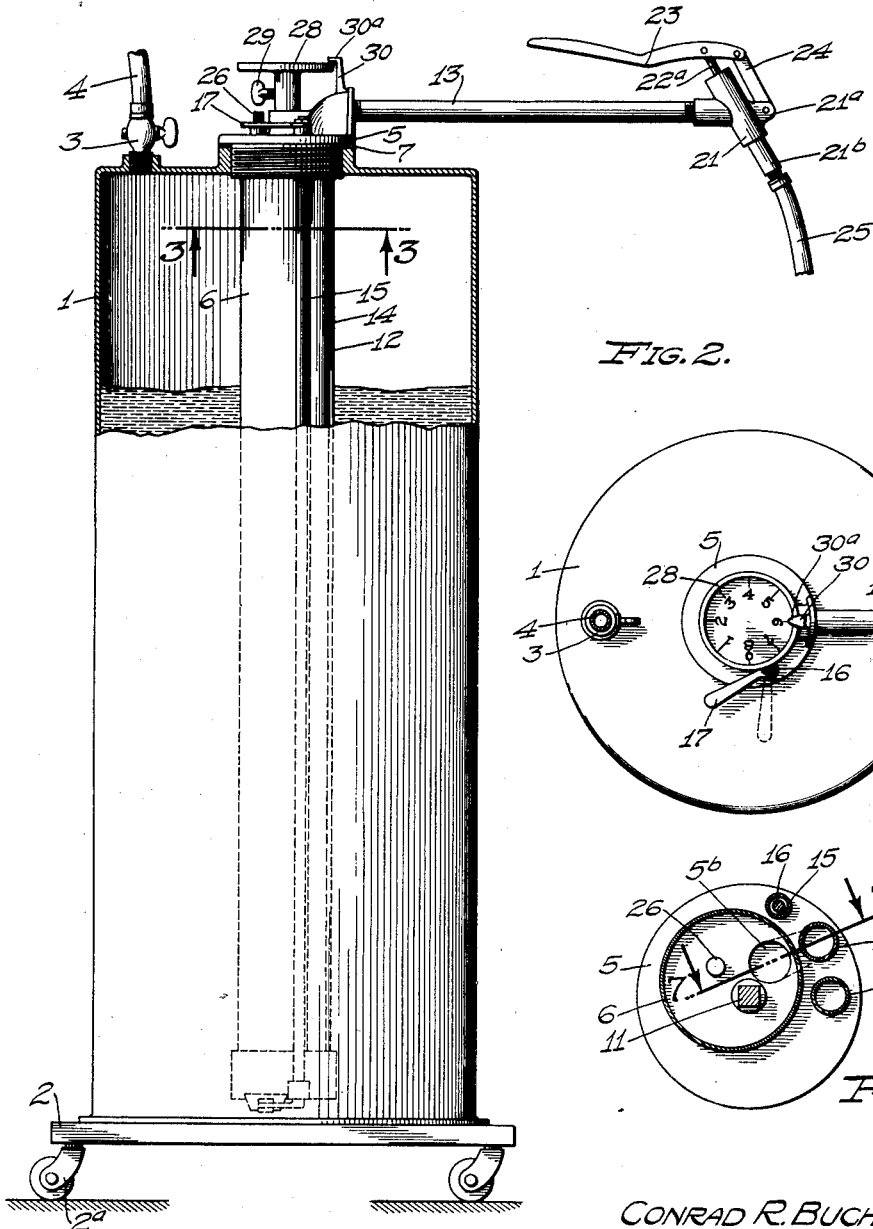

1,668,003

UNITED STATES PATENT OFFICE.

CONRAD R. BUCHET AND THEODORE E. BAKER, OF SAN DIEGO, CALIFORNIA, ASSIGNORS TO G. S. ROGERS, J. W. WELCH, LEONARD RUEGG, R. W. HEATHMAN, AND L. E. WALLIS, TRUSTEES OF THE CALIFORNIA HOLDING COMPANY, A COMMON-LAW TRUST OF CALIFORNIA.

GREASE MEASURING AND DISPENSING APPARATUS.

Application filed April 28, 1924. Serial No. 709,463.

Our invention relates to an automatic grease measuring and dispensing apparatus, and the objects of our invention are: First, to provide an apparatus of this class which is provided with a large portable grease container from which the grease contained therein may be automatically extracted for filling vehicle transmission and differential mechanisms, grease cups and the like; Second, to provide an apparatus of this class by which the grease extracted from its container and dispensed is automatically measured; Third, to provide an apparatus of this class by which the grease in the container is discharged by means of air pressure; Fourth, to provide an apparatus of this class by which the amount of grease discharged is automatically registered; Fifth, to provide a measuring means in connection with a dispensing apparatus which is provided with separate compartments, one of which is adapted to be filled from a container while another is emptied of its contents; Sixth, to provide a novel unitary registering means which is adapted to register the amount of the product discharged from the separate compartments of the measuring means; Seventh, to provide a measuring means having an extended tubular member which is adapted to extend into the product to be measured and in which is reciprocally mounted a piston separating the tubular member into two compartments, one of which compartments is adapted to be filled while the other is emptied of its contents; Eighth, to provide a novel piston guide member in connection with a measuring means, which is so positioned as to prevent the reciprocating piston from revolving and which is rotated by the reciprocation of said piston, thus providing a novel means for revolubly registering the longitudinal movement of the piston; Ninth, to provide a novel valve means for controlling the refilling of the compartments in the tubular member and the discharge of the contents of the other compartment; Tenth, to provide a novel means for calibrating the measuring means to a fixed unit measure; Eleventh, to provide a novel service discharge control valve means for controlling the discharge of the contents of the container under pressure; Twelfth, to provide a discharge control valve means of this class for producing additional pressure at the end of the service discharge conductor whereby grease may be forced into grease cups under greater than the normal pressure of the apparatus; Thirteenth, to provide as a whole a novelly constructed apparatus for measuring and dispensing grease, and Fourteenth, to provide such an apparatus which is very simple and economical of construction proportionate to its functions, durable, efficient, easy to operate, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of our grease measuring and dispensing apparatus, showing the main container connected to an air supply conductor, and showing a portion of the main conductor broken away and in section to facilitate the illustration; Fig. 2 is a plan view thereof with the discharge control valve means broken away; Fig. 3 is an enlarged transverse sectional view of a portion thereof with the section taken through 3—3 of Fig. 1; Fig. 4 is an enlarged fragmentary longitudinal sectional view of the measuring means of our apparatus; Fig. 5 is a transverse sectional view thereof, taken through 5—5 of Fig. 4; Fig. 6 is a fragmentary longitudinal sectional view thereof, taken through 6—6 of Fig. 4; Fig. 7 is a fragmentary longitudinal sectional view thereof, taken through 7—7 of Fig. 3, and Fig. 8 is a partial sectional and partial elevational view of the service discharge control valve means of our apparatus, with the section taken through the middle thereof.

Like characters of reference refer to similar parts and portions throughout the several views of the drawings.

The main grease container 1 of our apparatus is of considerable size, having a capacity of a hundred pounds or more, and is preferably mounted on a platform 2 provided with casters 2ª so that the same is readily portable. Near the upper end of the container is provided a cock 3 or other valve means to which is adapted to be connected an air conductor 4 for forcing air under considerable pressure into the upper end of the grease container 1. In the upper end of the container 1, preferably in the middle portion thereof, is screwably secured a head or plug 5 which is provided with a downwardly extending measuring container or cylinder 6, which extends into the container 1 to near the bottom thereof, there being provided a gasket 7 between the flange of the plug 5 and the container 1 to prevent air from escaping. At the bottom end of the cylinder 6 is provided a head member 8, at the lower end of which is reciprocally mounted a D-valve 9. Within the cylinder 6 is reciprocally mounted a piston or plunger 10, which is adapted to be forced upwardly or downwardly by means of the grease under pressure within said cylinder. Within the cylinder 6 is positioned a screw-like piston guide member 11, which is positioned eccentrically with respect to the axis of the cylinder 6 and is revolubly mounted at its upper and lower ends, respectively, in the plug 5 and the head 8, and extends through the piston 10 to one side of its center. The guide member 11 is polygonal in cross-section, preferably square with substantially flat sides, and is twisted about its axis so that its pitch is approximately one revolution to two feet or more of its length. The eccentric position of the guide member 11 relatively to the cylinder 6 and the piston 10 prevents said piston from rotating, but permits the guide member to be rotated with the reciprocal movement of the piston.

The head member 8 is provided with a plurality of ports 8ª, 8ᵇ and 8ᶜ, the port 8ª being adapted to connect the lower end of the cylinder 6 with the interior of the container 1 when the valve 9 is shifted to a certain position. The port 8ᵇ is connected by means of the transverse passage 8ᵈ in said head member, and by means of the discharge tube 12 with a passage 5ª in the plug 5, which latter passage communicates with the discharge conductor 13. The port 8ᶜ is connected by means of another transverse passage 8ᵉ in the head member 8, and a tube 14, with another passage 5ᵇ in the head or plug 5, which passage 5ᵇ communicates with the upper end of the cylinder 6. Between the plug 5 and the head member 8, and preferably extending into the same, is mounted another smaller tube 15 in which is rotatably mounted the valve operating rod 16, which is provided at the end extending upwardly and out of the plug 5 with a valve operating handle 17, as shown best in Figs. 1 and 2. The lower end of the rod 16 extends below the head 8 and is provided at said lower end with a crank arm 18 which is connected at its free end by means of links 19 with an outwardly extending lug 9ª at the one end of the D-valve 9.

Thus it will be seen that when the D-valve operating handle 17 is in the position shown by solid lines in Fig. 2 of the drawings, the valve member 9 is shifted to the position shown by solid lines in Fig. 6. Said valve member, thus shifted, connects the portion of the cylinder 6 below the piston 10, by means of the port 8ª, the passage in said valve member, the port 8ᵇ and the passage 8ᵈ in the head member, with the discharge tube 12, which communicates with the service discharge conductor 13. When the valve member 9 is in the position stated the port 8ᶜ communicates with the interior of the container 1 and permits the grease under pressure in said container to be forced through a correspondingly shaped opening through said port and the tube 14 into the upper portion of the cylinder 6 above the piston 10, thus automatically refilling the compartment in the upper portion of the cylinder and forcing the piston downwardly. When the valve member 9 is shifted by means of the handle 17 to the position shown by dotted lines, the port 8ª communicates with the interior of the container 1, thus refilling the lower portion of the cylinder 6 below the piston 10 and forcing the piston upwardly, the grease above said piston being forced out through the passage 5ᵇ and the conductor 14 into the passage 8ᵉ of the head 8 from which passage the grease is permitted to be discharged into the passage 8ᵈ by reason of the position of the valve member and into the discharge tube 12.

At the end of the guide member 11 extending upwardly through the plug 5 is mounted a registering dial 28, which may be adjusted revolubly relatively to the guide member 11 by means of a wing screw 29, so that the dial 28 may be easily set at zero when desired. The dial 28 is preferably calibrated in pounds and fractions of a pound, substantially as shown in Fig. 2. To the plug 5 is secured an index finger supporting arm 30, which is provided at its upper end with an index finger 30ª extending partially over the dial 28.

The service discharge conductor 13, which is preferably a pipe, is provided at its end with a combined grease discharge controlling and pressure producing valve means, which consists principally of a Y-shaped valve casing 21 in which is reciprocally mounted a plunger 22 connected at its reduced outer end 22ª intermediate the ends of the handle 23, which handle is pivotally connected at its one end by means of a link 24 to a lug 21ª on the one side of the valve casing 21. To the discharge end 21ᵇ of the valve casing 21 is adapted to be connected the flexible, service grease discharge conductor 25, which is adapted to be extended into the vehicle transmission or differential mechanism or attached to the grease cups of the vehicle or other apparatus.

It will be noted that with the plunger 22 in the position shown by solid lines in Fig. 8 the grease under pressure in the conductor 13 is adapted to be freely discharged into the conductor 25. When the plunger is shifted to the intermediate position shown by dotted lines, the outlet of the conductor 13 is shut off. When filling grease cups the plunger 22 is alternately shifted from its extreme receded position to its extreme inward position, which inward shifting, beyond its intermediate or shut off position, produces additional pressure within the flexible discharge conductor 25 which is desirable when filling grease cups.

In the head or plug 5 is provided a set screw 26 which extends into the cylinder 6 and is adapted to limit the upward movement of the piston 10, thus providing means for calibrating the cylinder 6 to discharge a specific amount during one stroke of the piston. The set screw 26 is locked in position by means of a lock nut 27.

It is obvious from this construction, as illustrated in the drawings and disclosed in the foregoing specification, that there is provided an automatic grease measuring and dispensing apparatus as aimed at and set forth in the objects of the invention, and though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent, is:

1. In a grease dispensing apparatus, a container adapted to contain grease under pressure, a grease measuring means secured to and extending into said container adapted to variously communicate with the interior thereof, and a valve means for simultaneously controlling the discharge of grease from and the refilling of said measuring means.

2. In a grease dispensing apparatus, a container adapted to contain grease under pressure, a cylinder positioned within and extending to near the bottom of said container, a piston reciprocally mounted in said cylinder, means in connection with said piston and extending beyond said cylinder for indicating the movement of said piston, and valve means in connection with said cylinder for alternately connecting the upper and lower portions thereof with the bottom portion of said container.

3. In a grease dispensing apparatus, a container adapted to contain grease under pressure, a cylinder positioned within and extending to near the bottom of said container, a piston reciprocally mounted in said cylinder, means in connection with said piston and extending beyond said cylinder for indicating the movement of said piston, valve means in connection with said cylinder for alternately connecting the upper and lower portions thereof with the bottom portion of said container, and other valve means for controlling the discharge of air into said container.

4. In a dispensing apparatus, a container, a cylinder positioned therein, a piston reciprocally mounted in said cylinder, a screw-like guide member eccentrically positioned and revolubly mounted within said cylinder and extending through said piston, and indicating means connected with the extending end of said guide member.

5. In a dispensing apparatus, a container, a cylinder positioned therein, a piston reciprocally mounted in said cylinder, a screw-like guide member eccentrically positioned and revolubly mounted within said cylinder and extending through said piston, indicating means connected with the extending end of said guide member, and a cylinder filling control valve mounted at the lower end of said cylinder.

6. In a dispensing apparatus, a storage container, a cylinder positioned therein, a piston reciprocally mounted in said cylinder, a screw-like member eccentrically positioned and revolubly mounted within said cylinder and extending through said piston, indicating means connected with the extending end of said screw-like member, a cylinder filling control valve mounted at the lower end of said cylinder, a discharge tube adapted to communicate with the lower portion of said cylinder through said filling control valve, and another tube adapted to communicate with the lower portion of said container and supply grease to the upper portion of said cylinder.

7. In a dispensing apparatus, a storage container, a cylinder positioned therein, a piston reciprocally mounted in said cylinder, a piston movement transmitting member operatively connected with said piston and extending beyond one end of said cylinder, indicating means connected with the extended end of said piston movement transmitting member, a cylinder filling control valve mounted at the lower end of said cylinder, a discharge tube adapted to communicate with the lower portion of said cylinder through said filling control valve, and another tube communicating with the lower portion of said container and leading to the upper end of said cylinder for supplying grease to the upper portion of said cylinder.

In testimony whereof, we have hereunto set our hands at San Diego, California, this 24th day of March, 1924.

CONRAD R. BUCHET.
THEODORE E. BAKER.